United States Patent [19]

Jones

[11] Patent Number: 4,836,411

[45] Date of Patent: Jun. 6, 1989

[54] MULTI-PURPOSE HEAVY DUTY CARGO CONTAINER

[76] Inventor: J. Leslie Jones, P.O. Box 233, Pasadena, Calif. 91102

[21] Appl. No.: 649,522

[22] Filed: Sep. 11, 1984

[51] Int. Cl.$^4$ .............................................. B65D 87/00
[52] U.S. Cl. ...................................... 220/1.5; 220/71; 105/375
[58] Field of Search ................. 206/335, 557; 220/1.5, 220/4 F, 6, 403, 71, 72; 410/25, 26, 27; 105/363, 375, 377

[56] References Cited

U.S. PATENT DOCUMENTS

| | | | |
|---|---|---|---|
| 2,016,430 | 10/1935 | Hice | 410/25 |
| 2,668,734 | 2/1954 | Bridge | 105/375 X |
| 3,106,900 | 10/1963 | Gallo et al. | 105/375 X |
| 3,623,631 | 11/1971 | Ford | 220/71 X |
| 3,684,122 | 8/1972 | Bonomi | 220/1.5 |
| 3,868,042 | 2/1975 | Bodenheimer | 220/1.5 X |
| 4,098,424 | 7/1978 | Liebscher et al. | 220/1.5 X |

*Primary Examiner*—Steven M. Pollard
*Attorney, Agent, or Firm*—J. L. Jones, Sr.

[57] ABSTRACT

A closed multi-purpose product container suitable for heavy duty transportation of commodity products by railroad flat cars, freight ships and land motor truck power trailer has a full top opening hinged flat rigid lid, as well as the conventional opening rear flat rigid door. The closed hinged flat rigid lid transportation container (CLC) has structural welded seams securing the two long flat rigid side walls, a flat rigid bottom wall, and a front flat rigid end wall, so as to safely carry high density lump loads such as lump coal, powdered and granular chemicals, grains and other solid loads, with secure transportation and freedom from external and internal contamination, when the flat rigid rear door is closed and sealed. Welded triangular strength reinforcement trusses, multiple V-shaped strength stiffening pleats and half round truss means may be equivalently, typically formed in and on the side walls, top lid, rear door and bottom wall of the CLC. Typically, a CLC can have 20 to 40 ft. length, and 8 to 10 foot high by 8 ft. wide, or have other selected dimensions, and can have structurally reinforcement to carry typical loads up to 100 tons or more. The rectangular transportation containers (CLC) can have in combination sealed bladders of neoprene, or other suitable flexible impermeable plastics conformingly disposed inside the CLC. The bladders can provide transportation for fluids, or further seal and control the purity of granular solid commodity products. Paired auto chassis wheel supporting ramps can be simply and securely disposed in the CLC by integral attachments, each ramp securely clamping and holding a single auto chassis at a predisposed angular disposition to the bottom wall of the CLC. Up to six or seven autos, or the like, can be slantingly and securely held in a CLC without shipping damage, the autos secured on the ramps being disposed in the CLC through the top hinged lid or the rear door.

3 Claims, 3 Drawing Sheets

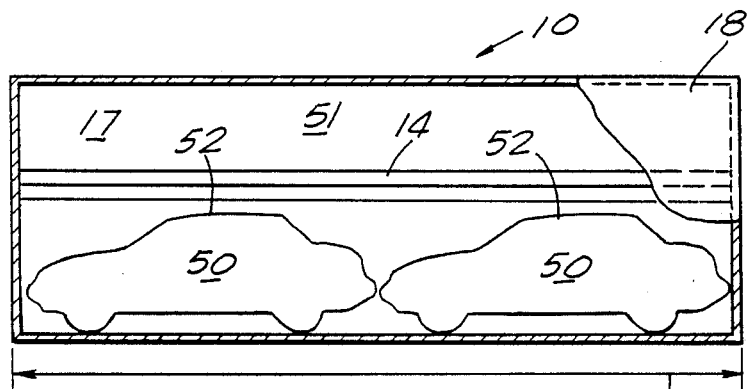
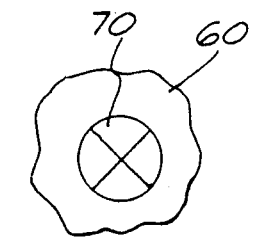
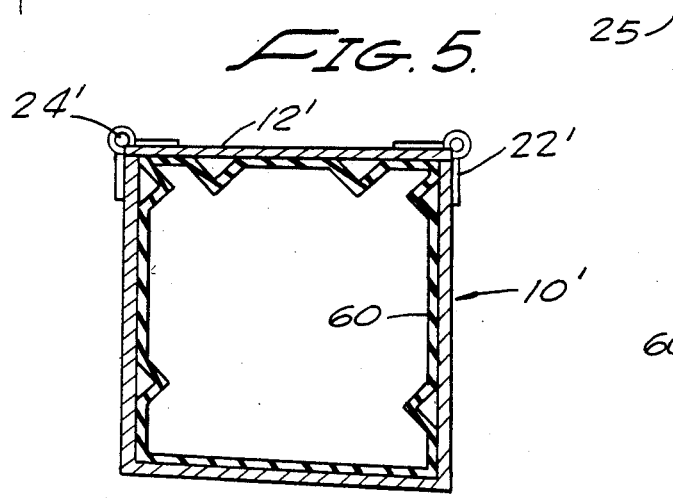
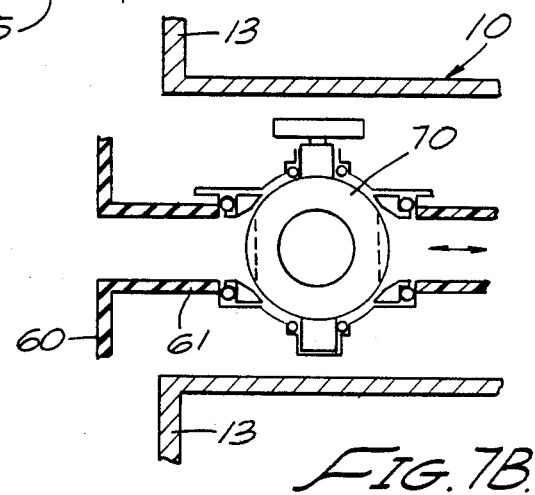
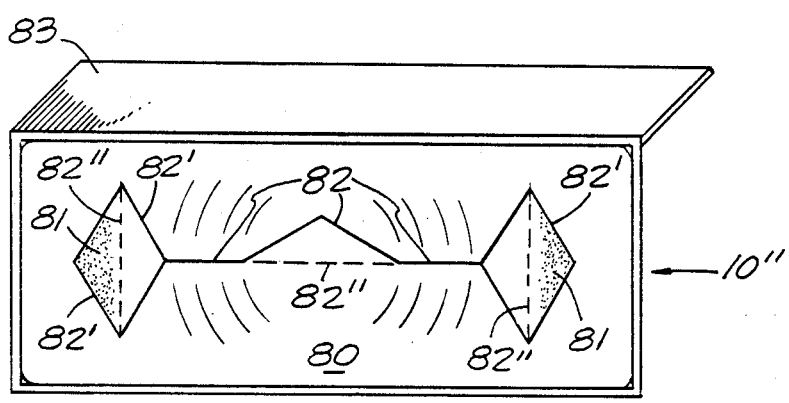
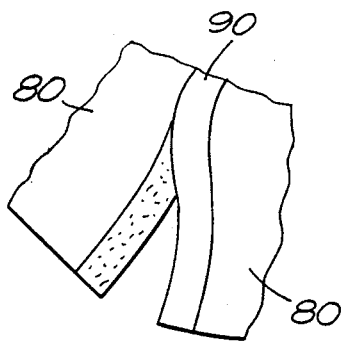
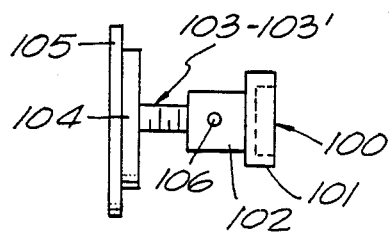
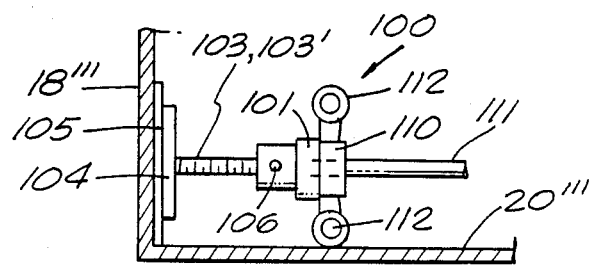

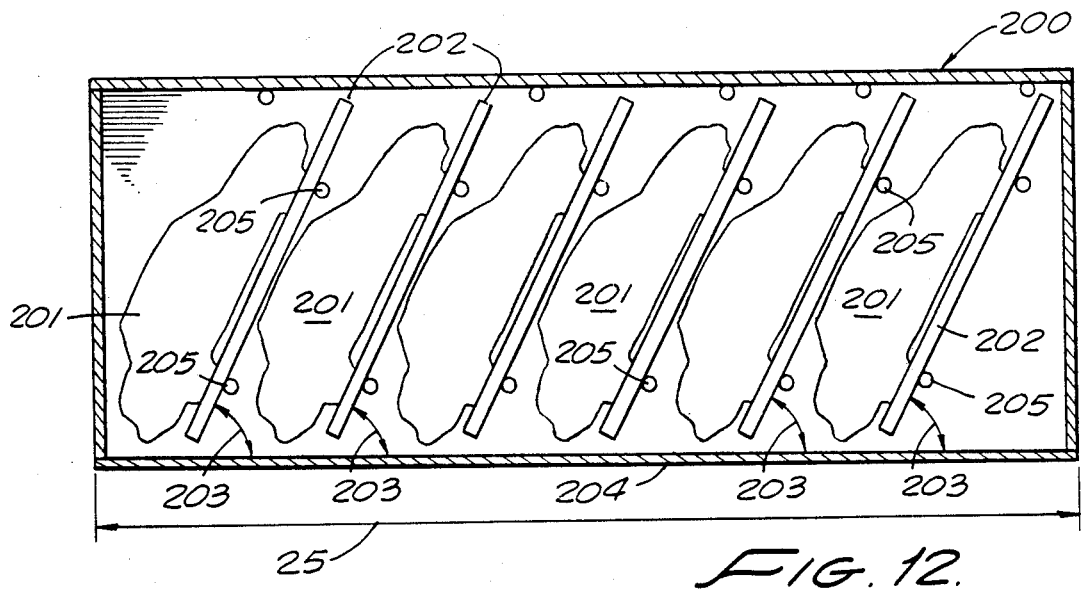
FIG. 12.
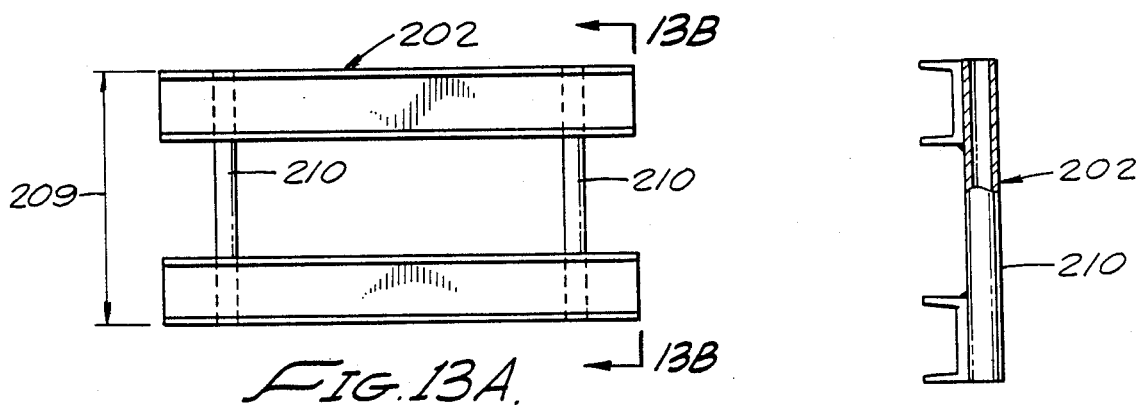
FIG. 13A.
FIG. 13B.
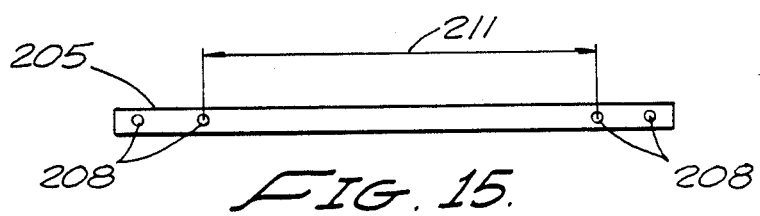
FIG. 15.
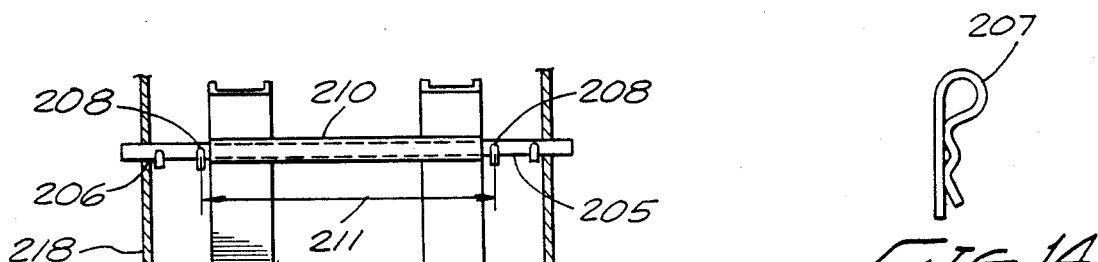
FIG. 14.
FIG. 16.

MULTI-PURPOSE HEAVY DUTY CARGO CONTAINER

BACKGROUND OF THE INVENTION

The rectangular transportation container (CLC) of this invention is classified in Classes 220/1.5, 4, 6, 7 and 217/43, 65.

In U.S. Pat. No. 2,126,950 issued on Aug. 16, 1938 to F. Ditchfield, there is disclosed and claimed a transportation means having a metallic body with side and end walls, a hinged means for closing a door in one of said walls, and automatic locking means carried by the transportation means adjacent the lower margin of the door. The locking means has a plurality of spaced locking dogs.

In U.S. Pat. No. 3,128,897 issued Apr. 14, 1964 to W. B. Wilkins, there is disclosed and claimed a cargo container of lengths up to 40 feet and capacity up to 30 tons or more. The containers are low cost, non-metallic materials. The container wall is a plurality of superimposed laminar of fiber glass sheets bonded by a polyester resin adhesive. A front end and a rear opening door provide metal or non-metal frames on which a tubular wall is formed.

In U.S. Pat. No. 3,481,503 issued Dec. 2, 1969, Kloess and Quade disclose and claim an open top freight container having a detachable top cover. A watertight stiff top cover is provided with cam operated secure locking devices which insures the tight fit of the detachable top cover alignment on the container.

Sherwood discloses and claims in U.S. Pat. No. 3,460,174 issued Nov. 25, 1969, a foundation frame upon which a plurality of freight containers can be mounted in indexed relation thereto, and transported as a single unit.

In U.S. Pat. No. 3,972,437 issued Aug. 3, 1976 Lovide, Meller and Morse disclose and claim top four corners hoist brackets on a cubical container for lifting and maneuvering the container.

Funaioli, Rossetti and Landini in U.S. Pat. No. 4,177,907, issued Dec. 11, 1979 teach and claim a collapsible, folding cargo container having a base wall with an upright base section of a wall. A corresponding extension section of each wall is provided.

SUMMARY OF THE INVENTION

A closed multi-purpose product container suitable for heavy duty transportation of commodity products by railroad flat cars, freight ships and land motor truck powered trailers has a full top opening hinged flat rigid lid, as well as having a conventional rear opening flat rigid door, in combination. The closed hinged flat rigid lid transportation container (CLC) has structural welded seams securing two long flat rigid walls, a bottom flat rigid wall, and a front end flat rigid wall, so as to carry high density lump loads, such as lump coal, powdered and granular chemicals, grains and other solid loads. The closed hinged flat rigid lid transportation metal container can have structural strength reinforcement by metal truss members welded to the container walls, inside or outside the walls. The multiple truss members can have triangular and half round cross section, and be welded to the CLC container inside walls. When product is dumped from the CLC container through the open top lid, no granular product can be lodged behind a truss member. The multiple truss members can stiffen the CLC container, so the hinged top lid can be unlatched and opened, and the loaded CLC container can be lifted by a crane, turned over and the product load dumped out of the container into a product pile. No granular product will be retained inside the container behind trusses. Equivalently substituting for welded triangular strength reinforcement trusses, multiple V-shaped strength stiffening pleat means and half round trusses may be substituted and formed in and on the side walls, top lid, rear door and bottom of the CLC. The V-shaped stiffening pleat means in the metal panels can be formed in the panels while the heated panels are pressed in a hydraulic press. The V-shaped pleat means can be disposed in the panels in both vertical and horizontal directions with respect to the completely assembled CLC, providing maximum panel strength stiffening, equivalent in strength to the welded triangular trusses, as is needed.

The hinged top flat ridge lid and the hinged rear flat rigid door of the container in combination enable the use of the same container for multi-purpose types of product loads. When the CLC container is loaded with granular or lump product commodities, such as coal, pure sand, or grains, or the like, the hinged top flat rigid lid of container and the hinged rear flat rigid door can be sealed by gaskets which prevent the product from leaking out and contaminating the surroundings. When the cleaned CLC is used as a rear door loading container, multiple automobiles can be disposed inside, and secured to prevent the cars rolling. Paired auto chassis wheel supporting ramps can be simply and securely adaptively disposed in the CLC by integral attachments, each ramp secured, clamping and holding a single auto chassis at a predisposed acute angular disposition to the bottom wall of the CLC. Up to six or seven autos or the like commodities can be slantingly and securely held in a CLC without shipping damage, the autos disposed and secured with the ramps through the hinged lid or rear door. The protected cars can be stacked on a container freight ship, and shipped to its destination, protected from the ocean air and spray.

Neoprene or other flexible chemically impermeable, resistant plastic bladders can be sized and adaptively closely fitted inside the CLC container, the bladders having carefully secured quick disconnect loading and unloading valve ports. Thus, the bladders can carry protected cargos of fluids, such as oils, liquid chemicals, aqueous solutions and the like. The hinged top lid and the hinged rear door of the CLC container can have fluid proof gasket seals. The bladder-CLC container combination is more secure for liquid storage and transportation than a single wall metal tank. Likewise the bladder-CLC containers can also transport pure product stock without the product becoming contaminated.

Thus, a series of CLC containers can be quickly top loaded at a coal mine, the top lids closed, and the containers stacked. The CLC containers can then be loaded on a train of flat cars, transported to a ship freight dock, and quickly loaded on a container freighter, all without spilling coal on the right-of-way and docks. On reaching the destination for the coal, the loaded containers are picked up by a crane, the open hinged lid CLC containers are turned over, and the coal dumped into a storage pile.

The CLC containers are then washed and sent to a return freight depot for loading automobiles in the CLC containers, and securing the automobiles from movement in the CLC containers. Additional rack carrying provision can be made for overhead loading of other smaller item freight in the automobile loaded CLC containers. The sealed, loaded containers are protected from sea air and spray during the return voyage.

Truck wheels and tires can also be movably secured to the CLC containers, so the CLC containers can also be used as motor truck trailers.

The CLC containers can typically be 20 to 40 ft. long, and 8 ft. wide by 8 ft. to 10 ft. high. Other CLC dimensional values can be utilized to accommodate other national transportation container standards. The walls of the CLC containers can range from 3/16 to ¾ inch thick, with truss reinforcement for the walls. The CLC containers can carry loads typically up to 100 tons or more. If truss reinforcement is applied inside the CLC container, a triangular or half-round cross section truss member can be utilized so as to eliminate depository ledges inside the CLC for the granular products being transported. The CLC container can typically be steel, aluminum, nickel or other metal stock, or plastic reinforced fiberglass, as is required.

Included in the objects of this invention are:

To provide a closed product container (CLC) suitable for product transportation by railroad flat car, freight ship, and land motor truck powered trailers.

To provide a hinged full flat rigid top opening lid, as well as a conventional rear flat rigid opening door, in combination in a product container (CLC).

To provide a hinged top flat rigid lid which opens quickly on a product container, providing for quick loading and unloading of a product container (CLC) with lump and granular products.

To provide a transportation container (CLC) with gasketed top flat rigid lid and rear door closures, which can minimize contamination going into and out of the container (CLC).

To provide a closed product container (CLC) combination with a flexible, chemically impervious, leakproof bladder closely disposed within the CLC, providing for transportation of fluids in the CLC, with double container wall protection.

To provide a closed product container with adaptively sized auto chassis and auto chassis ramp securing attachments, providing for the loading and transportation of multiple autos in a single CLC on ramps.

Other objects and advantages of this invention are taught in the following description and claims.

BRIEF DESCRIPTION OF THE DRAWINGS

The description of this invention is to be read in conjunction with the following drawings:

FIG. 5 is an axial length 25 cross sectional view of the interior of a CLC, loaded with an automobile, and having an overhead rack for storage of additional product load in the CLC.

FIG. 6 is a cross sectional view of a CLC having a flexible, impermeable plastic bladder secured and disposed inside a CLC, the bladder providing containment for a liquid cargo.

FIGS. 7A and 7B are: (7A) a fragmentary frontal view of a typical loading valve of the rear bladder face providing a loading means for the secured bladder of FIG. 6 or the like; (7B) a side elevational sectional view of the typical valve of FIG. 7A secured and disposed in a CLC.

FIG. 8 is a top planar view of a CLC as illustrated in FIG. 1, and having a flexible plastic envelope enclosing a granulated solid load, the plastic envelope being shown in a partially open condition at the top of the CLC, the envelope having Velcro fasteners or the like for finally enclosing the granular load.

FIG. 9 is an isometric projective view of a partially closed Velcro fastener as operatively utilized on the envelope of FIG. 8.

FIG. 10 is an isometric projection of a wheel stabilizer for an automobile which has operative jack means, suitable for positioning between an inner panel wall of a CLC and the hub area of automobile wheel, positioning and securing the automobile wheel.

FIG. 11 is a diagramic elevational view of a single wheel stabilizer in operative position, stabilizing the position of an automobile chassis wheel hub in a CLC, preventing the automobile from moving when all wheels are stabilized by a separate stabilizer.

FIG. 12 is an elevational sectional view through a CLC loaded with each auto disposed, held, and secured by restraining bars, each auto locked on a chassis ramp held at an arc to the container floor wall.

FIG. 13A is a plan view of a chassis ramp. FIG. 13B is an end view of the chassis ramp through 13B—13B of FIG. 13A.

FIG. 14 is a plan view of a retaining lock spring pin 207.

FIG. 15 is a plan view of the retaining bar 205.

FIG. 16 is a fragmentary sectional view of an empty CLC container 200' with the restraining bar pairs 205 disposed in position through the container walls 218 and 219.

DESCRIPTION OF THE PREFERRED EMBODIMENT OF THE INVENTION

Figure 1:
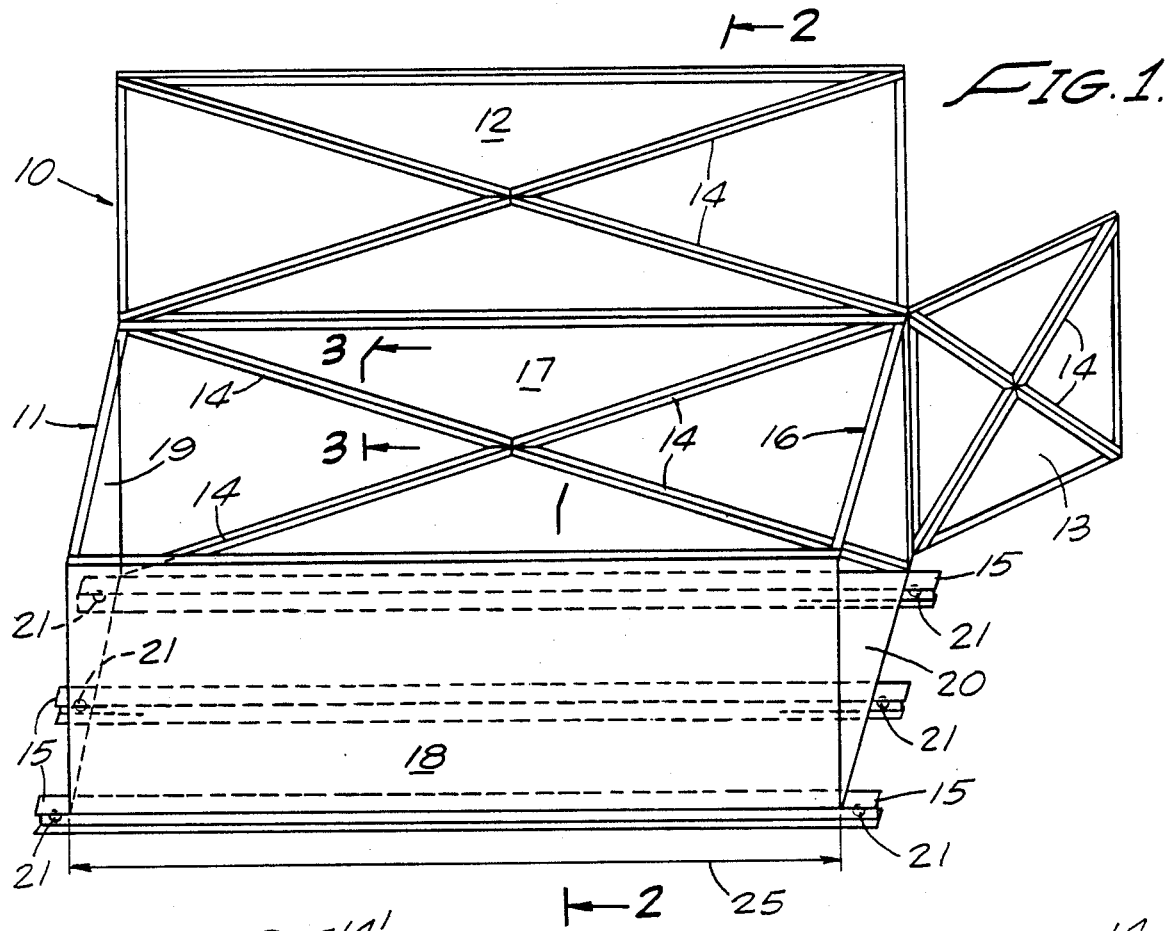
FIG. 1 is an isometric projective view of a product container (CLC) suitable for product transportation, having a full top opening hinged flat rigid lid and a conventional rear opening flat rigid door.

Referring to FIG. 1, the open multi-purpose product container (CLC) 10 suitable for heavy duty transportation of commodity products by railroad flat cars, freight ships and land motor truck powered trailers, has a reinforced rectangular box 11 and a full top opening hinged flat rigid lid 12, as well as a conventional rear opening flat rigid door 13, and a long, axial length 25. The CLC 10 can have structurally reinforcement triangular and half-round solid metal trusses 14 secured and disposed on the two long side walls 17 and 18, and on the forward end wall 19, all 14 trusses disposed and secured by welding or by riveting. The container (CLC) 10 also can have the top hinged flat rigid lid 12 stiffened by welded trusses 14, or the like, as well as the rear opening door 13, secured and stiffened by the welded trusses 14. The triangular or half-round cross-section trusses 14 can be secured to the flat rigid panel walls 12, 13, 17, 18, 19, and bottom flat rigid wall 20, as by welding or other conventional securing and stiffening means. The bottom flat rigid wall 20 also has the multiple stiffening and supporting beams 15 secured and disposed on the exterior of bottom 20. Apertures 21 are disposed in the termini of 15, providing apertures 21 which can be attached to a crane by lifting hooks, chains, or cables for lifting container 10.

A 90° triangular or round cross section truss 16 is positioned and securely welded or otherwise fastened at the terminal ends of flat rigid wall panels 17 and 18 adjacent door 13, providing wall positions and wall structural stability to the flat rigid wall panels 17 and 18. The triangular or round cross section truss 16 has its cross section corner rotationally positioned adjacent the load in the CLC 10, providing no flat surface in CLC 10 which can hold and retain a granular or powdered load in CLC 10 on dumping CLC 10 from the lip top 12.

Figure 2:
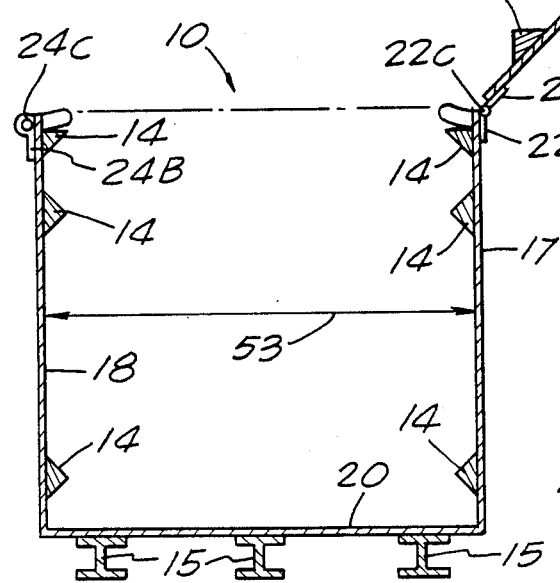
FIG. 2 is a sectional view through 2—2 of FIG. 1, illustrating interior and exterior reinforcement truss members as a welded part of the product container (CLC).
Figures 3A, 3B, 3C:
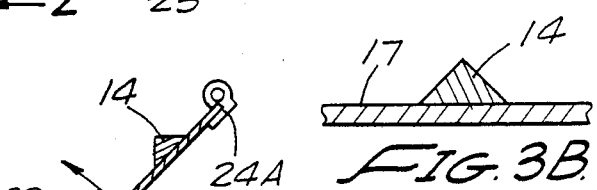
FIG. 3A is a fragmentary sectional view through 3—3 of FIG. 1 having a solid right-triangular truss member welded to a panel member of the CLC.
FIG. 3B is an alternate V-shaped strength stiffening panel means.

In FIG. 2 the cross sectional view through 2—2 of FIG. 1 illustrates the open product container (CLC) 10 having a flat rigid side wall 18 and another flat rigid side wall 17, with a bottom flat rigid wall 20. The bottom wall 20 is stiffened and supported by the multiple longitudinal supporting beams 15. The welded triangular trusses or half-round trusses 14 are shown on internal faces of the walls 17 and 18, supporting, strengthening and securing the walls, when container (CLC) 10 is loaded with product (see FIGS. 3A, 3B). As an alternate substitution for welded triangular strength reinforcement trusses, half-round trusses, multiple V-shaped strength stiffening pleat means 26 may be substituted and formed in the side walls 17, 18, 19, top lid 12, rear door 13 and bottom 20 of the CLC. (See FIG. 3C). The V-shaped stiffening pleat means 26 in the metal panels can be formed in the panels while the heated panels are pressed in a hydraulic press. The V-shaped pleat means 26 can be disposed in the panels in both vertical and horizontal directions with respect to the completely assembled CLC, providing maximum panel strength stiffening, equivalent in strength to the welded triangular trusses.

The plural hinges 22 are also shown in cross section, the plural hinges 22 securing the wall 17 to the lid 12, permitting the lid 12 to rotate in the arc 23 and shut the lid 12 on the container (CLC) 10. The lid 12 can be locked and secured to wall 18 by the rod locking means 24. The rod locking means 24 has two interlocking hasp pair components 24A and 24B, which are secured and locked together ty a rod pin 24C, on closing the lid 12 on side wall 18. The plural hinge 22 has two flexible hinge components 22A and 22B each welded or riveted permanently onto the lid 12 and the wall panel 17, and rotatingly secured together by the rotating rod 22C. The length of hinges 22 and the number of hinges 22 can be that required by usage of the lid 12. The number and length of the rod locking means 24 can be the desired values. The plural hinges 22 securing lid 12 and the rod locking means 24 are also likewise disposed and secured on door 13 to provide for the door 13 proper utilization as is required.

Figures 4A, 4B:
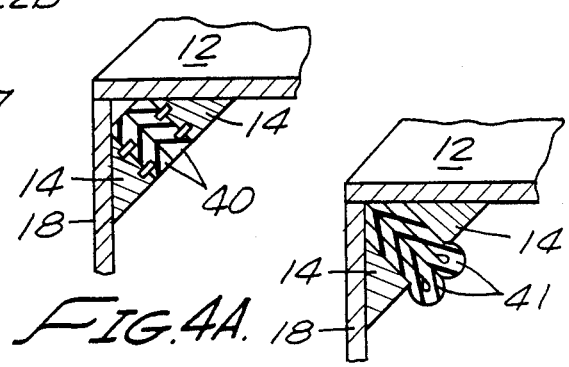
FIGS. 4A and 4B are fragmentary cross sectional views of sealing gasket components which secure the product inside a closed top flat rigid lid and a closed rear flat rigid door of a CLC, preventing the product from leaking out of the CLC.

FIGS. 4A and 4B illustrate two modifications of dust-proof gasket means in cross section which compressively seal the lid 12 and the door 13 on their closing. The lid 12 and door 13 each have the welded trusses 14 secured and disposed an adaptive distance inside the lid 12 and door 13 external perimeters when the container CLC 10 is ready for loading. A truss 14 is around the lid 12 perimeter and another truss 14 is disposed and secured around the top edge of the wall panels 17, 18 and 19, as well as the top of door 13. In FIG. 4A, the sponge rubber gasket means 40 are adaptively sized and permanently secured on the trusses 14 by securing means continuously disposed around the coadjacent faces of 14, providing compressive sealing means when lid 12 is laid on wall panel 18. In FIG. 4B, the flexible tubular gasket means 41 are adaptively sized and permanently secured on the perimeter trusses 14 by securing means, continuously disposed around the coadjacent faces of 14, providing sealing means when lid 12 is laid on wall panel 18. The coadjacent trusses 14 of lid 12 and wall panels 17, 18 and 19, as well as door 13 are adaptively sized and disposed to provide seals for both gasket means 40 and 41.

Referring to FIG. 5, a container CLC 10 is shown in sectional longitudinal axis view 25, having an automobile 50 disposed and secured in container 10, and having additional storage space 51 above the automobile 50. The longitudinal truss 14 is disposed and secured to the interior walls of wall panels 17 and 18 above the car top 52. The paired longitudinal trusses 14 can provide support for additional freight pallets disposed across the width 53 of CLC 10 (FIG. 2).

Referring to FIG. 6, there is shown a cross section of CLC 10', a closed lid 12' rotating on hinge 22' and sealed by hasp 24'. Inside the container 10', there is a flexible impermeable fluid-proof plastic or neoprene rubber bladder 60, conforming to the container 10' interior. The bladder 60 conforms contiguously in interior cross section to the container 10' and in length to the container 10' interior length of 25. Thus, liquid cargoes can be safely shipped in the rectangular containers, the exterior container 10' and the interior plastic or rubber bladder have together a double container for the fluids, providing fluid leakage protection.

FIGS. 7A and 7B illustrate valve fittings on the base of the bladder 60 at the bladder end bottom adjacent a door panel of wall 13. The bladder 60 has an inlet port 61 which is vulcanized to the ball valve 70. Other conventional valve types can replace the ball valve 70. A top air vent and valve (not shown) is disposed and secured on bladder of bladder 60 adjacent the lid 12' (of FIG. 6), providing for escape of air of filling bladder 60.

FIG. 8 illustrates a top plan view of a loaded container CLC 10" having an inner bag envelope 80 containing a typical granular load 81. The granular load 81 is completely enveloped in and capable of being sealed within envelope 80 by the typical Velcro type seal 82. The seal 82 closes the envelope 80 and unsealed portions 82' of envelope 80 can be finally sealed at 82" to provide completely sealed envelope 80 containing the granular load 81. The hinged lid 83 can then seal container 10".

FIG. 9 illustrates the well known Velcro type fastener 90 disposed and secured on the closing seam of an envelope 80, sealing the seal of 80. Obviously other types of closing seams can be utilized on envelope 80, including simply multiple folds of the seam of envelope 80.

Referring to FIG. 10, there is an isometric view of a wheel hub stabilizing jack 100, having an automobile hub enclosure 101, concentrically secured to a jack base 102. The jack base 102 has a mechanical rack means 103 or an equivalent hydraulic ram means 103' headed by a metal pressure plate 104, which is capped by a centrally disposed and secured frictional snubber plate 105. 106 is a conventional jacking or hydraulic ram exterior means In operation of FIG. 11 the wheel hub stabilizing jack 100 is shown diagrammatically positioned between a container 10''' wall 18''' and a hub 110 of an automobile having an axle 111. The hub enclosure 101 is coaxially disposed and secured over auto hub 110. The rack means 103 or 103' is operatively extended from the jack base 107, by conventional mechanical jacking or hydraulic pressure at 106. The frictional snubber plate 105 is secured against the wall 18''', being frictionally held there by the pressure of plate 104. By applying a hub stabilizing jack 100 to each of the four hubs of the automobile wheels 112, the car can be simply secured in place during shipment over long distances. The jacks 100 can easily be relaxed at 106 and removed from the hubs at the destination.

The hinged top flat rigid lid and the hinged rear flat rigid door of the container in combination enable the use of the same container for two or more types of product loads. When the CLC container is loaded with granular or lump product, such as coal, pure sand, other pure chemicals, grains, or the like, the hinged top flat rigid lid of container and the hinged rear flat rigid door can be sealed by gaskets which prevent the product from leaking out and contaminating the surroundings. When the closed CLC is used as a rear door loading container, multiple automobiles can be disposed inside and secured to prevent the cars rolling.

A further modification of the container 10 is illustrated in FIG. 12, wherein the container 200, equivalent in inventive advance in structure to container 10, is shown in side elevational sectional view corresponding to length 25. The multiple autos 201 are shown disposed and secured on locked and secured multiple auto chassis ramps 202 which are disposed at angular arcs 203 to the container 200 bottom wall 204. The multiple autos 201 are secured and indexed, each on a chassis ramp 202, as by short padded chains, or U-bolts (not shown) locking the axle of the front and rear auto chassis 201 to the chassis ramp 202, as in FIGS. 12, 13A, 13B, 14, 15, 16. The auto chassis 201 and ramp 202 are then picked up by a forklift, adjusted to a predetermined arc 203 to the foor by a specially adapted forklift, and then moved into a container 200. Restraining bars 205 are plurally inserted through apertures 206 in container 200. The plural restraining bars 205 being adaptively secured and indexed in position in container 200, locked to container 200 and concurrently locked to the chassis ramp. Spring lock rataining pins 207 are multiplicately applied to indexing apertures 208 adaptively sized and disposed in the restraining bars 205. The applied retaining pins 207, shown in plan view in FIG. 14 are secured in multiple bars 205, in apertures 208, preventing the ramps 202 and bars 205 from sliding sideways and moving out of their designated positions during transportation of autos in container 200.

In more detailed explanation the auto 201 is tightly secured by chains or U-bolts to the cross pipe members 210 of the ramp 202. The pair of hollow cross pipe members 210 are adaptively secured in position to provide for the insertion of the pair of restraining bars 205 through the pipes 210, and the bars 205 are also inserted into the prepositioned apertures 206, in the container 200. Thus auto 201 and the ramp 202 are angularly positioned and supported at the arc 203 to the bottom wall 204. To prevent the sidewise sliding and banging of the ramp 202 against the container walls 218 and 219, the restraining bars 205 have predisposed and prepositioned apertures 208 disposed far enough apart 211 to provide for the insertion of suitably sized locking spring pins 207 in the pair of apertures 208, locking the chassis ramp 202 into a relatively fixed position. Likewise, the restraining bar 205 is locked and indexed into the container 200 walls 218 and 219 by an additional pair of spring pins 207.

The protected cars can be stacked on a container freight ship, without denting, and shipped to its destination, protected from the ocean air and spray.

Neoprene or other flexible, impermeable, chemically resistant plastic bladders can be sized and adaptively closely fitted inside the CLC container, the bladders having carefully secured quick disconnect loading and unloading valve ports. Thus, the bladders can carry protected cargoes of fluids, such as oils, liquid chemicals aqueous solutions and the like. The hinged top lid and the hinged rear door of the CLC container can have fluid-proof gasket seals. The bladder-CLC container combination is more secure dor liquid storage and transportation than a single wall metal tank.

Thus, a series of CLC containers can be quickly top loaded at a coal mine, the top lids closed, and the containers stacked. The CLC containers can then be loaded on a train of flat cars, transported to a ship freight dock, and quickly loaded on a container freighter, all without spilling coal on the right-of-way and docks. On reaching the destination for the coal, the loaded containers are picked up by a crane, the open hinged lid CLC containers are turned over, and the coal dumped into a storage pile.

The CLC containers are then washed and sent to a return freight depot, for loading multiple automobiles in the CLC containers, and securing the automobiles from movement in the CLC containers. Additional rack carrying provisions can be made for overhead loading of other smaller item freight in the automobile loaded CLC containers. The sealed, loaded containers are protected from sea air and spray during the return voyage.

Truck wheels and tires can also be movably secured to the CLC container, so the CLC containers can also be used as motor truck trailers.

The CLC containers 10 can typically be 20 to 40 ft. long, and 8 ft. wide by 8 to 10 ft. high. Other CLC dimensional values can be utilized to accommodate other national transportation container standards. The walls of the CLC containers can range from 3/16 to ¾ inch thick, or thereabouts, with wall steel truss reinforcement. The CLC containers can carry loads typically up to 100 tons or more. If truss reinforcement is applied inside the CLC container, a half-round and a triangular cross section truss member can be utilized so as to eliminate depository ledges inside the CLC for the granular products being transported. The CLC container can typically be steel, aluminum, or other metal stock, or plastic reinforced fiberglass, as is required.

Many modifications in the rectangular transportation product container can be made in the light of my teachings. It is understood that within the scope of the claims, the invention can be practiced otherwise than as described.

I claim:

1. In a heavy duty product transportation container having a rectangular box having an axial length of from 10 to 40 feet, having a box width of from 7 to 12 feet, and a box depth of from 7 to 12 feet, said rectangular box having two long opposed flat rigid panel sides, a fixed flat rigid front end, a full rear flat rigid door, equivalently equal in area to said front end, and a flat rigid box bottom, said box area components disposed and integrally secured at the area perimeters, forming a commercial box structure, the combination comprising:

a full length flat rigid top hinged lid, said lid having at least one hinge means securing said lid to one said long panel side, a flat rigid box bottom having bottom structural trusses disposed lengthwise under said bottom and integrally secured thereto, said bottom integral structural trusses having securing means for crane hoists, at least one tension reinforcement truss means permanently securing said two long panel sides together in place overhead on said panel sides and adjacent said top full length hinged lid and one said truss means disposed adjacent said rear door, preventing said panel side from wobbling, and, multiple reinforcement truss members, each member having cross sections free of flat exterior surfaces and two opposed terminal edges capable of retaining product thereon, said truss members continuously welded and interiorily secured to said container panels.

2. In a heavy duty product transportation container having a rectangular box having an axial length of 10 to 40 feet, a box width of 7 to 12 feet, and box depth of 7 to 12 feet, said rectangular box having two long opposed flat rigid panel sides, a fixed flat rigid front end, a full flat rigid rear door, equivalently equal in area to said front end, and a flat rigid box bottom, said box area components disposed and integrally secured at the area perimeters forming a commercial box structure, the combination comprising:

four wheel hub stabilizing jacks each having, a car wheel hub enclosure cup concentrically secured to a jack base, a jack elongating means concentrically secured to said hub enclosure at one means termini, a metal pressure plate concentrically secured to a second termini of said jack elongating means, and, a concentrically disposed frictional snubber plate secured to said pressure plate, each wheel hub stabilizing jack disposed and secured at one wheel hub enclosure cup to a car wheel of a car disposed in said rectangular box, and said frictional snubber plate disposed and secured against a panel side, securing said car movement.

3. In a heavy duty product transportation container having a rectangular box having an axial length, a box width, and box depth, said rectangular box having two long opposed flat rigid panel sides, a fixed flat rigid front end, a full flat rigid rear door, equivalently equal in area to said front end, and a flat rigid box bottom, aforesaid listed rectangular box structural components having area dimensions equivalent to present heavy duty commercial cargo box containers, said box area components disposed and integrally secured at the area perimeters forming a commercial box structure, the combination comprising:

a full length flat rigid hinged lid, and a flat rigid box bottom having bottom structural trusses disposed lengthwise under said bottom and integrally secured thereto, said bottom integral structural trusses having securing means for crane hoists, and at least one tension reinforcement truss means securing said two long panel sides together in place overhead on said panel sides and adjacent said flat rigid full length top hinged lid, preventing said panel sides from wobbling, said full length flat rigid top hinged lid having at least one hinge means securing said lid to one said long panel side, at least one auto chassis ramp, each ramp having a pair of spaced and equal length chassis wheel supporting ramps for four chassis wheels, said ramps spaced and secured to an adaptively separated and paired hollow pipe cross members, said chassis ramp and the auto secured thereto are disposed and secured in said container at a selected predetermined acute angle to said container bottom, said angle selected to prevent damage to said auto, two pair of prepositioned apertures are disposed in opposed pairs in said container opposed long panels, providing said acute predetermined angular securing and restraining apertures for said chassis ramp, at least one of two restraining bars adaptively sized and secured in each one of said two opposed pairs of prepositioned apertures, each said bar having at least four indexing apertures positioned and disposed therein, each said restraining bar also indexed through the interior of one said hollow pipe cross member of each said chassis ramp and supporting the chassis ramp load, at least four restraining pin means disposed in aforesaid at least four indexing apertures, said indexing apertures and pins positioned so as to prevent the restraining bars from shifting out of the container apertures and preventing the car chassis ramp from moving sideways on the supporting restraining bar.

* * * * *